(12) United States Patent
Keller et al.

(10) Patent No.: US 11,611,913 B2
(45) Date of Patent: Mar. 21, 2023

(54) TECHNIQUE FOR PREPARING USER EQUIPMENT MOBILITY

(71) Applicant: Telefonaktiebolaget LM Ericsson (publ), Stockholm (SE)

(72) Inventors: Ralf Keller, Würselen (DE); Afshin Abtin, Sollentuna (SE); Ann-Christine Sander, Skepplanda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 17/264,970

(22) PCT Filed: Aug. 21, 2018

(86) PCT No.: PCT/EP2018/072519
§ 371 (c)(1),
(2) Date: Feb. 1, 2021

(87) PCT Pub. No.: WO2020/038563
PCT Pub. Date: Feb. 27, 2020

(65) Prior Publication Data
US 2021/0314824 A1    Oct. 7, 2021

(51) Int. Cl.
*H04W 36/00* (2009.01)
*H04W 8/24* (2009.01)
(Continued)

(52) U.S. Cl.
CPC ......... *H04W 36/0022* (2013.01); *H04W 8/24* (2013.01); *H04W 28/0268* (2013.01);
(Continued)

(58) Field of Classification Search
CPC ............... H04W 36/0022; H04W 8/24; H04W 28/0268; H04W 36/0016; H04W 36/32;
(Continued)

(56) References Cited

U.S. PATENT DOCUMENTS

2018/0192471 A1* 7/2018 Li ............................ H04W 4/60
2018/0199398 A1* 7/2018 Dao ....................... H04W 76/27
(Continued)

FOREIGN PATENT DOCUMENTS

WO    2011056046 A2    5/2011
WO    2018128529 A1    7/2018

OTHER PUBLICATIONS

Ericsson, handling of Ethernet and unstructured PDU session types when interworking with EPC; 3rd Generation Partnership Project (3GPP), XP051346592, Oct. 26, 2017 (Year: 2017).*
(Continued)

*Primary Examiner* — Abdullahi Ahmed
(74) *Attorney, Agent, or Firm* — Sage Patent Group

(57) ABSTRACT

A technique for preparing User Equipment, UE, mobility to a 2G/3G network for a UE moving from a 5G network, optionally via a 4G network, to the 2G/3G network is disclosed. A method implementation of the technique is performed by a network node of the 5G network and comprises triggering (S304) providing one or more 2G/3G Quality of Service, QoS, parameters to the UE required to hand over at least one QoS flow established between the UE and the 5G network to the 2G/3G network when the UE moves to the 2G/3G network.

17 Claims, 8 Drawing Sheets

(51) Int. Cl.
*H04W 28/02* (2009.01)
*H04W 36/32* (2009.01)
*H04W 84/04* (2009.01)

(52) U.S. Cl.
CPC ....... *H04W 36/0016* (2013.01); *H04W 36/32* (2013.01); *H04W 84/042* (2013.01)

(58) Field of Classification Search
CPC ... H04W 84/042; H04W 60/04; H04W 76/34; H04W 36/14; H04W 36/30; H04W 76/22
See application file for complete search history.

(56) References Cited

U.S. PATENT DOCUMENTS

| | | | | |
|---|---|---|---|---|
| 2018/0376384 | A1* | 12/2018 | Youn | H04W 92/02 |
| 2019/0098547 | A1* | 3/2019 | Chong | H04W 36/12 |
| 2020/0053617 | A1* | 2/2020 | Park | H04W 48/18 |
| 2020/0112907 | A1* | 4/2020 | Dao | H04M 15/84 |
| 2020/0120570 | A1* | 4/2020 | Youn | H04W 76/11 |
| 2020/0329404 | A1* | 10/2020 | Vikberg | H04L 65/1016 |

OTHER PUBLICATIONS

PCT International Search Report and Written Opinion dated May 23, 2019 for International Application No. PCT/EP2018/072519, 11 pages.

Ericsson, 3GPP, SA WG2 Meeting #123, S2-177739, "Handling of Ethernet and Unstructured PDU Session Types When Interworking with EPC (23.502)", Ljubljana, Slovenia, Oct. 23-27, 2017, 10 pages.

CATT, 3GPP, SA WG2 Meeting #122, S2-174594, "TS 23.502: Discussion on EPS QoS Mapping", San Jose Del Cabo, Mexico, Jun. 26-30, 2017, 2 pages.

3GPP, 3rd Generation Partnership Project, Technical Specification Group Services and System Aspects, "Procedures for the 5G System", Stage 2 (Release 15), 3GPP TS 23.502 V15.2.0 (Jun. 2018), Valbonne, France, 308 pages.

* cited by examiner

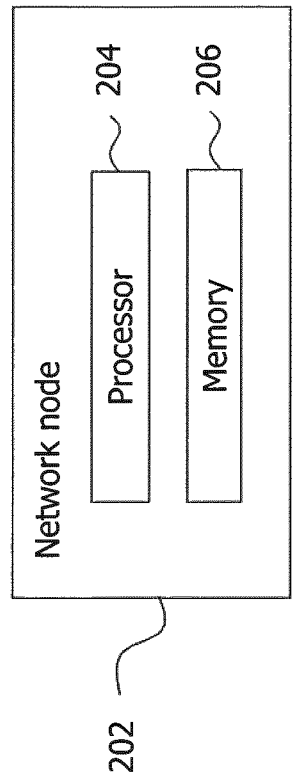
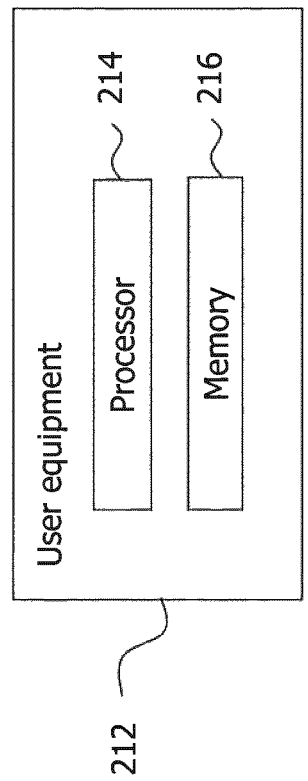

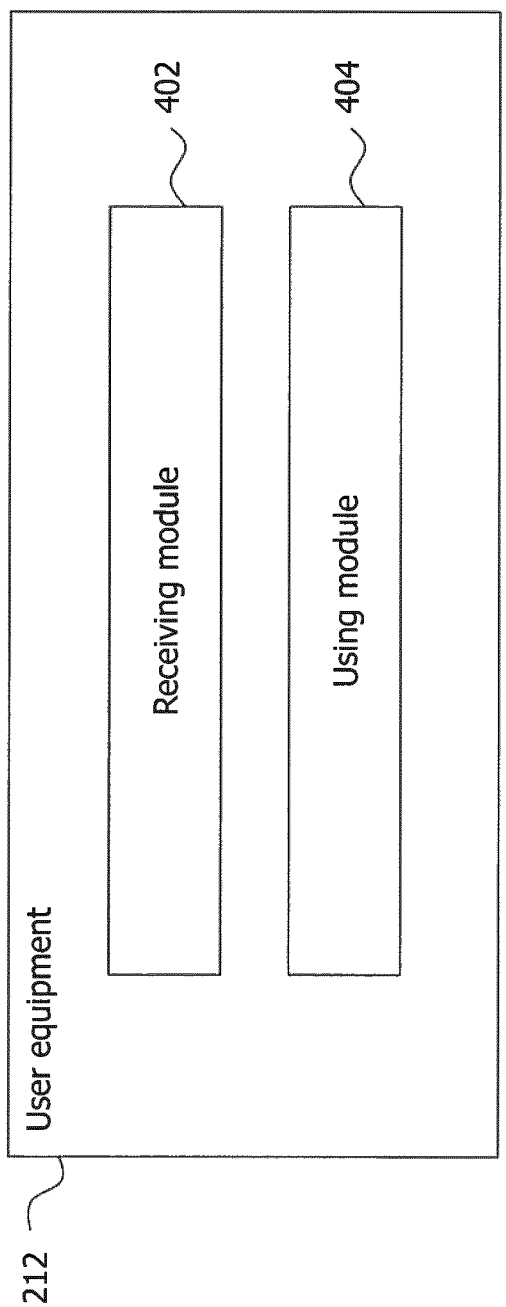

TECHNIQUE FOR PREPARING USER EQUIPMENT MOBILITY

CROSS-REFERENCE TO RELATED APPLICATIONS

This application is a 35 U.S.C. § 371 national stage application for International Application No. PCT/EP2018/072519, entitled "TECHNIQUE FOR PREPARING USER EQUIPMENT MOBILITY", filed on Aug. 21, 2018, the disclosures and contents of which are hereby incorporated by reference in their entireties.

TECHNICAL FIELD

The present disclosure generally relates to the field of wireless communication. In particular, a technique for preparing User Equipment (UE) mobility to a 2G/3G network for a UE moving from a 5G network, optionally via a 4G network, to the 2G/3G network is presented. The technique may be embodied in methods, computer programs, apparatuses and systems.

BACKGROUND

Over the recent decades, several generations of mobile communication systems have been deployed. While mobile communication systems according to the first generation (1G) are generally based on analog transmission, second generation (2G) mobile communications systems have introduced—by means of the Global System for Mobile Communications (GSM) standard—digital transmission techniques for the first time. The General Packet Radio Service (GPRS) and High Speed Circuit Switched Data (HSCSD) standards—sometimes also classified as 2.5G systems—have been introduced for the transmission of data, and the Enhanced Data Rates for GSM Evolution (EDGE) standard has been developed as an enhancement for the transmission rates in GSM systems. The introduction of the Universal Mobile Telecommunications System (UMTS) has established a third generation (3G) of mobile communication systems which particularly enables data driven services, such as video telephony and mobile broadband Internet access, for example. The UMTS standard has further been enhanced by the High Speed Packet Access (HSPA) and HSPA+ standards. In the following, the term "2G/3G" will be used to denote any standard of a 2G or 3G system, including the ones mentioned above.

The Long Term Evolution (LTE) standard has been introduced as a fourth generation (4G) mobile communication system and has been enhanced by the LTE Advanced and LTE Advanced Pro standards. The next generation, i.e., the fifth generation (5G), of mobile communications systems is currently under development and generally aims at providing support for enhanced mobile broadband (e.g., for Ultra High Definition (UHD) and virtual presence), support for critical communication (e.g., for robot/drone and emergency communication), support for massive machine type communication (e.g., for e-health applications), support for enhanced network operation (e.g., network slicing and interworking) and support for vehicle-to-everything communication (e.g., for autonomous driving), for example. Much of the standardization work on the above-mentioned standards is and has been done by the 3rd Generation Partnership Project (3GPP).

For the ongoing standardization of 5G networks, there has been a general requirement that interworking with 2G/3G networks should not be taken into account in order to allow minimizing legacy aspects for 5G networks and to avoid the requirement of supporting direct interfaces between 5G networks and 2G/3G networks, for example. The assumption was that mobility between 5G networks and 2G/3G networks, if needed, would generally work via 4G networks, i.e., from 5G networks to 4G networks and then from 4G networks to 2G/3G networks, and vice versa. In practice, however, mobility may also occur directly between 5G networks and 2G/3G networks and, also, there may be restrictions which are unacceptable for some deployments which have not yet been discussed or investigated in detail. Direct mobility between 5G networks and 2G/3G networks may be required due to radio planning reasons of operators, or due to base stations being temporarily out of order, for example.

As an example, it is referred to the deployment scenario illustrated in FIG. 1 in which a legacy Packet Data Network Gateway (PGW) acts as a common gateway serving the 2G/3G network as well as the 4G network and a Session Management Function+Packet Data Network Gateway-Control (SMF+PGW-C) entity acts as a common gateway supporting interworking between and serving the 4G network as well as the 5G network. When a UE moves from the 5G network to the 4G network and subsequently from the 4G network to the 2G/3G network in such a scenario, Internet Protocol (IP) address preservation may not be possible in general, so that the UE cannot generally keep its IP address during mobility between the 5G, 4G and 2G/3G networks. Rather, the UE may need to re-initiate respective sessions (e.g., a Packet Data Network (PDN) connection or a Protocol Data Unit (PDU) session through which the UE receives a service from the respective network) each time the UE moves from one network to another, possibly including performing initial IP Multimedia Subsystem (IMS) registrations including full authentication, for example. This may not only result in session breaks but also in additional load in the networks.

SUMMARY

Accordingly, there is a need for a technique which avoids one or more of the problems discussed above, or other problems.

According to a first aspect, a method for preparing UE mobility to a 2G/3G network for a UE moving from a 5G network, optionally via a 4G network, to the 2G/3G network is provided. The method is performed by a network node of the 5G network and comprises triggering providing one or more 2G/3G Quality of Service (QoS) parameters to the UE required to hand over at least one QoS flow established between the UE and the 5G network to the 2G/3G network when the UE moves to the 2G/3G network.

The UE may move directly from the 5G network to the 2G/3G network or the UE may move to the 2G/3G network via the 4G network. When the UE moves directly from the 5G network to the 2G/3G network, the at least one QoS flow may be handed over to at least one corresponding Packet Data Protocol (PDP) context in the 2G/3G network (e.g., for each QoS flow, a corresponding PDP context may be established in the 2G/3G network) and, when the UE moves from the 5G network to the 2G/3G network via the 4G network, the at least one QoS flow may first be handed over to at least one corresponding bearer in the 4G network (e.g., for each QoS flow, a corresponding bearer may be established in the 4G network) and the at least one corresponding bearer may then be handed over to at least one corresponding PDP context in the 2G/3G network when the UE moves from the 4G network to the 2G/3G network (e.g., for each bearer, a corresponding PDP context may be established in the 2G/3G network). The at least one QoS flow may belong to a PDU session established between the UE and the 5G network and the at least one bearer may belong to a corresponding PDN connection established between the UE and the 4G network.

Since, when moving to the 2G/3G network, a PDP context may not be activated for the at least one QoS flow (or the at least one corresponding bearer, respectively), providing the one or more 2G/3G QoS parameters to the UE prior to moving to the 2G/3G network may enable transferring the at least one QoS flow (or the at least one corresponding bearer, respectively) into a PDP context of the 2G/3G network, as described above. The one or more 2G/3G QoS parameters may in other words be required to establish at least one PDP context in the 2G/3G network which corresponds to the at least one QoS flow established between the UE and the 5G network. Transferring the respective QoS flow (or the at least one corresponding bearer, respectively) into a corresponding PDP context may involve mapping an IP address and an Access Point Name (APN) associated with the PDU session to which the at least one QoS flow belongs (or an IP address and an APN associated with the PDN connection to which the at least one corresponding bearer belongs, respectively) to a corresponding IP address and a corresponding APN associated with the newly established PDP context. IP address preservation may thus be enabled when moving between the 5G network and the 2G/3G network (optionally, via the 4G network).

The at least one QoS flow established between the UE and the 5G network may be allocated on at least one common network entity that supports interworking between the 4G network and the 5G network, such as an SMF+PGW-C acting as common gateway for both the 4G and the 5G network, for example. The network node may in fact be the SMF+PGW-C, but it will be understood that the technique presented herein may be performed by any other appropriate network node of the 5G network as well, such as an Access and Mobility Function (AMF), for example. The common network entity, particularly the SMF+PGW-C, may have an interface to at least one of a Serving GPRS Support Node (SGSN) of the 2G/3G network (e.g., a Gn/Gp interface to the SGSN) and a Serving Gateway (SGW) of the 2G/3G network. In case of the SGW, the common network entity may have an S5/S8 interface to the SGW which, in turn, may have an S4 interface to the SGSN, for example. It will be understood that, even if the SMF+PGW-C supports such interfaces to the 2G/3G network, the UE may only reuse QoS flows (or bearers) as PDP contexts when moving from the 5G (or 4G) network to the 2G/3G network when the relevant 2G/3G QoS parameters are available to the UE.

The network node may be configured to keep track of the source access technology and the target access technology in the mobility scenario so that, depending on the particular source access technology and target access technology (e.g., respective Radio Access Technology (RAT) types), the network node may decide on triggering providing the one or more 2G/3G QoS parameters to the UE, as described above. Mobility from the 5G network to the 4G network as well as from the 4G network to the 2G/3G network may involve an Inter Radio Access Technology (IRAT) handover, for example, but it will be understood that the technique presented herein may be employed in all other cases of UE mobility between the 5G network, the 4G network and the 2G/3G network as well. In either case, mobility may take place in both idle mode and connected node. As an example, the technique may be applied to cases of idle mode mobility when the UE reselects the RAT or to cases of redirects, e.g., when the Radio Access Network (RAN) directs the UE to a different RAN which employs a different RAT. A Next Generation RAN (NG-RAN) of a 5G network may direct the UE to a GSM EDGE RAN (GERAN) of a 2G network, a UMTS Terrestrial RAN (UTRAN) of a 3G network, or an Evolved UTRAN (E-UTRAN) of a 4G network, for example.

Triggering providing the one or more 2G/3G QoS parameters to the UE may be conditionally performed when the UE is determined to have 2G/3G capabilities (e.g., when the UE is capable of attaching to a 2G/3G network). In other words, the presence of 2G/3G capabilities of the UE may be used as a condition for triggering providing the one or more 2G/3G QoS parameters to the UE so that triggering providing the one or more 2G/3G QoS parameters to the UE may only be performed when the UE is determined to have 2G/3G capabilities. An indication that the UE has 2G/3G capabilities may be obtained from the UE. The network node may obtain this indication directly from the UE (e.g., in a signaling procedure involving both the UE and the network node) or in an indirect manner (e.g., from another network node which obtained the indication from the UE previously). For example, the indication that the UE has 2G/3G capabilities may be obtained during an attach procedure performed by the UE with the 5G network or during a PDU session configuration procedure performed by the UE with the 5G network. The PDU session configuration procedure may correspond to a PDU session establishment procedure or a PDU session modification procedure, for example. The indication may be conveyed in the form of a network capability information element as part of the UE network capabilities provided from the UE to the network, for example.

Alternatively, triggering providing the one or more 2G/3G QoS parameters to the UE may be performed independently from whether the UE has 2G/3G capabilities. In such a case, the network node may always provide the one or more 2G/3G QoS parameters to the UE and, if the UE is not 2G/3G capable (e.g., if the UE does not support 2G/3G QoS parameters), the UE may simply ignore the received 2G/3G QoS parameters. The UE may in other words only use the received 2G/3G QoS parameters if the UE understands them. The network node, especially when the network node is an AMF, may or may not trigger providing the one or more 2G/3G QoS parameters to the UE per area or per Public Land Mobile Network, PLMN, depending on the operator deployment. Triggering providing the one or more 2G/3G QoS parameters to the UE may thus be conditionally performed depending on at least one of an area in which the UE is located and a PLMN with which the UE is associated.

The one or more 2G/3G QoS parameters may correspond to one or more "Release 99" (R99) QoS parameters, for example, and may include at least one of a traffic class, a delivery order, an indication of delivery of erroneous Service Data Units (SDUs), a maximum SDU size, a maximum bit rate for uplink, a maximum bit rate for downlink, a residual Bit Error Rate (BER), an SDU error ratio, a transfer delay, a traffic handling priority, an Allocation and Retention Priority (ARP), a guaranteed bit rate for uplink, and a guaranteed bit rate for downlink. The one or more 2G/3G QoS parameters may be mapped from one or more corresponding 5G QoS parameters, e.g., from one or more QoS parameters of the at least one QoS flow established between the UE and the 5G network. More specifically, when the UE moves directly from the 5G network to the 2G/3G network, each of the one or more 5G QoS parameters of the at least one QoS flow may be mapped to a corresponding 2G/3G QoS parameter among the one or more 2G/3G QoS parameters and, when the UE moves from the 5G network to the 2G/3G network via the 4G network, each of the one or more 5G QoS parameters of the at least one QoS flow may first be mapped to a corresponding 4G QOS parameter, such as an Evolved Packet System (EPS) bearer QoS parameter, and each of the one or more 4G QoS parameters may then be mapped to a corresponding 2G/3G parameter among the one or more 2G/3G QoS parameters when the UE moves from the 4G network to the 2G/3G network. In one variant, the one or more 2G/3G QoS parameters may be provided to the UE in a single message together with the one or more 5G QoS parameters (or the 4G QoS parameters, respectively) and, in another variant, the one or more 2G/3G QoS parameters may be provided to the UE in a separate message, i.e., separate from the 5G QoS parameters (or the 4G QoS parameters, respectively). The one or more 2G/3G parameters may be mapped during establishment of the at least one QoS flow in the 5G network, for example.

According to a second aspect, a method for implementing UE mobility to a 2G/3G network for a UE moving from a 5G network, optionally via a 4G network, to the 2G/3G network is provided. The method is performed by the UE and comprises receiving one or more 2G/3G QoS parameters from a network node of the 5G network and using the one or more 2G/3G QoS parameters to hand over at least one QoS flow established between the UE and the 5G network to the 2G/3G network when the UE moves to the 2G/3G network.

The method according to the second aspect defines a method from the perspective of a UE which may be complementary to the method performed by the network node according to the first aspect. The UE and the network node of the second aspect may correspond to the UE and the network node described above in relation to the first aspect. As such, those aspects described with regard to the method of the first aspect which are applicable to the method of the second aspect may be comprised by the method of the second aspect as well, and vice versa. Unnecessary repetitions are thus omitted in the following.

As in the method of the first aspect, the one or more 2G/3G QoS parameters may be required to establish at least one PDP context in the 2G/3G network which corresponds to the at least one QoS flow established between the UE and the 5G network. An indication that the UE has 2G/3G capabilities may be sent to the 5G network, wherein the indication that the UE has 2G/3G capabilities may be sent during an attach procedure performed by the UE with the 5G network or during a PDU session configuration procedure performed by the UE with the 5G network. The one or more 2G/3G QoS parameters may be received from the network node in a single message together with one or more 5G QoS parameters.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a network node for preparing UE mobility to a 2G/3G network for a UE moving from a 5G network, optionally via a 4G network, to the 2G/3G network is provided. The network node is configured to perform any of the method steps presented herein with respect to the first aspect. The network node may comprise at least one processor and at least one memory, wherein the at least one memory contains instructions executable by the at least one processor such that the network node is operable to perform any of the method steps presented herein with respect to the first aspect.

According to a fifth aspect, a UE for implementing UE mobility to a 2G/3G network is provided, wherein the UE moves from a 5G network, optionally via a 4G network, to the 2G/3G network. The UE is configured to perform any of the method steps presented herein with respect to the second aspect. The UE may comprise at least one processor and at least one memory, wherein the at least one memory contains instructions executable by the at least one processor such that the UE is operable to perform any of the method steps presented herein with respect to the second aspect.

According to a sixth aspect, there is provided a system comprising a network node according to the fourth aspect and a UE according to the fifth aspect.

BRIEF DESCRIPTION OF THE DRAWINGS

Implementations of the technique presented herein are described herein below with reference to the accompanying drawings, in which:

FIGS. 2a and 2b illustrate exemplary compositions of a network node and a UE according to the present disclosure;

FIGS. 4a and 4b illustrate a modular composition of the UE and a corresponding method embodiment which may be performed by the UE;

DETAILED DESCRIPTION

Figure 1:
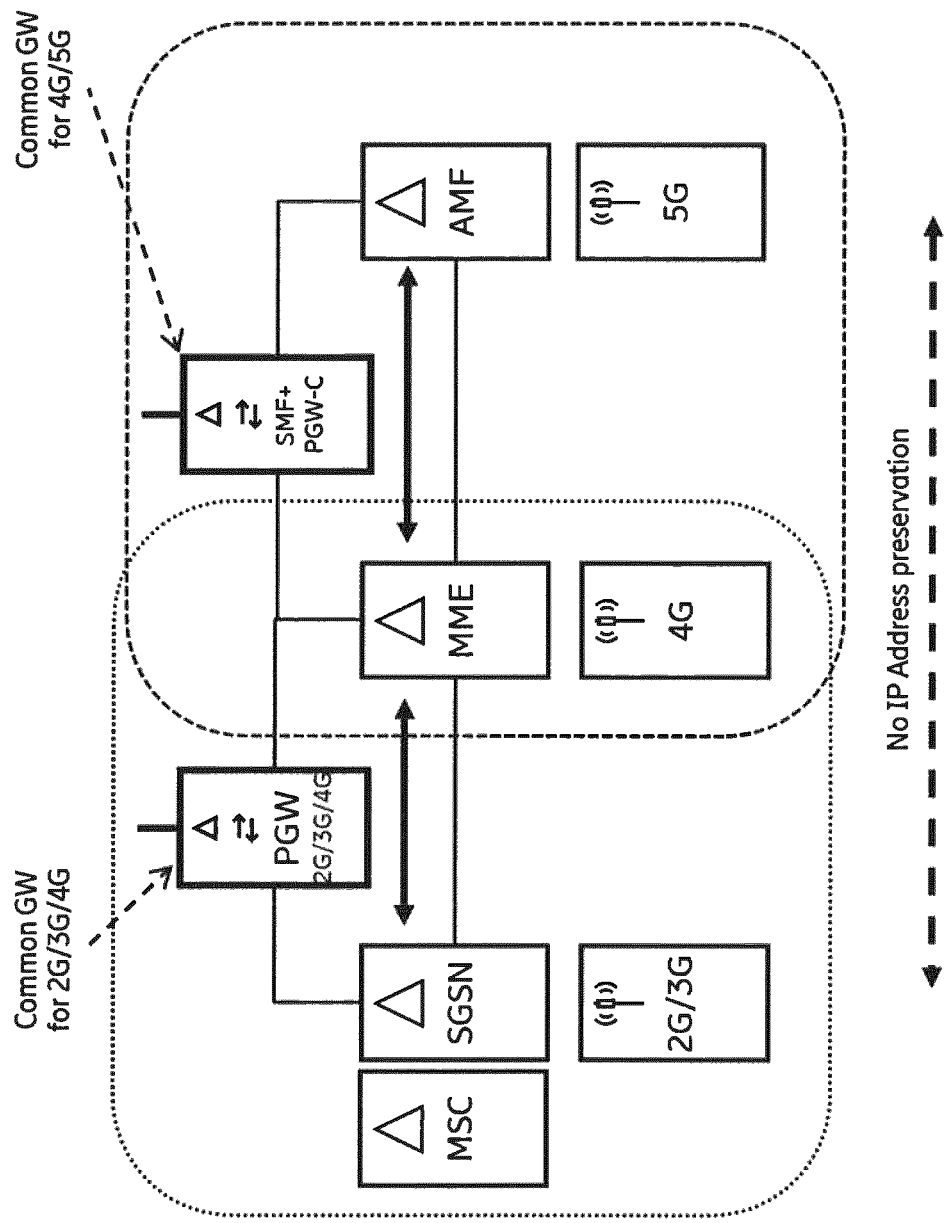
FIG. 1 illustrates an exemplary deployment scenario in which a legacy PGW acts as a common gateway serving a 2G/3G network and a 4G network and an SMF+PGW-C acts as a common gateway serving the 4G network and a 5G network.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 2a schematically illustrates an exemplary composition of a network node 202 for preparing UE mobility to a 2G/3G network for a UE moving from a 5G network, optionally via a 4G network, to the 2G/3G network. The network node 202 comprises at least one processor 204 and at least one memory 206, wherein the at least one memory 206 contains instructions executable by the at least one processor 204 such that the network node 202 is operable to carry out the method steps described herein below.

It will be understood that the network node 202 may be implemented as a physical computing unit as well as in the form of a function or a virtualized computing unit, such as a virtual machine, for example. It will further be appreciated that the network node 202 may not necessarily be implemented as a standalone computing unit, but may be implemented as components—realized in software and/or hardware—residing on multiple distributed computing units as well, such as in a cloud computing environment, for example.

FIG. 2b schematically illustrates an exemplary composition of a UE 212 for implementing UE mobility to a 2G/3G network, wherein the UE 212 moves from a 5G network, optionally via a 4G network, to the 2G/3G network. The UE 212 comprises at least one processor 214 and at least one memory 216, wherein the at least one memory 216 contains instructions executable by the at least one processor 214 such that the UE 212 is operable to carry out the method steps described herein below.

Figure 3A:
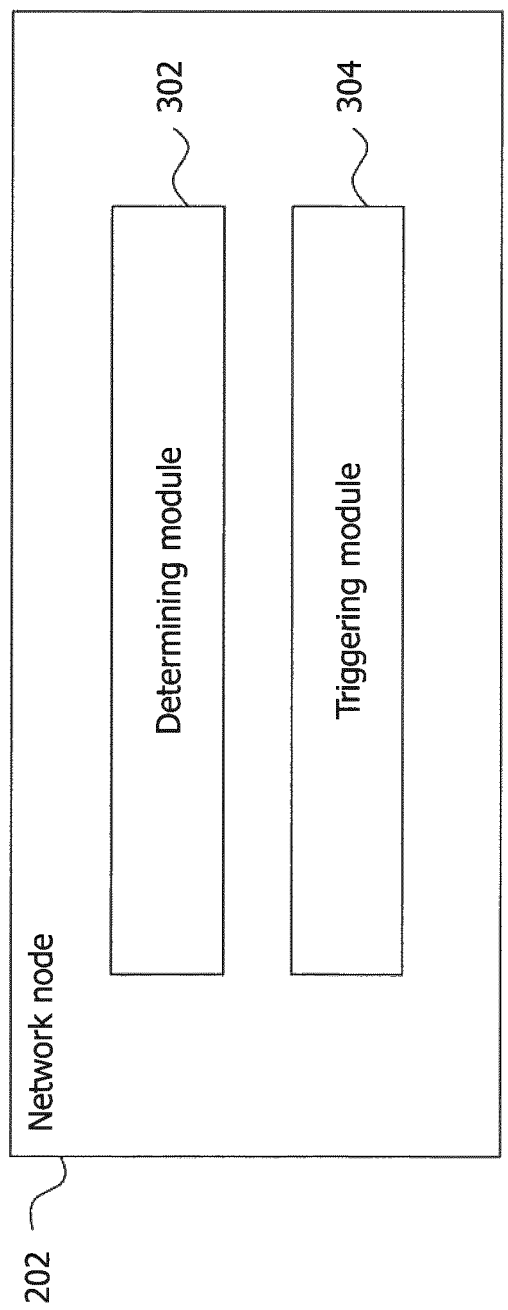
FIGS. 3a and 3b illustrate a modular composition of the network node and a corresponding method embodiment which may be performed by the network node.
Figure 3B:
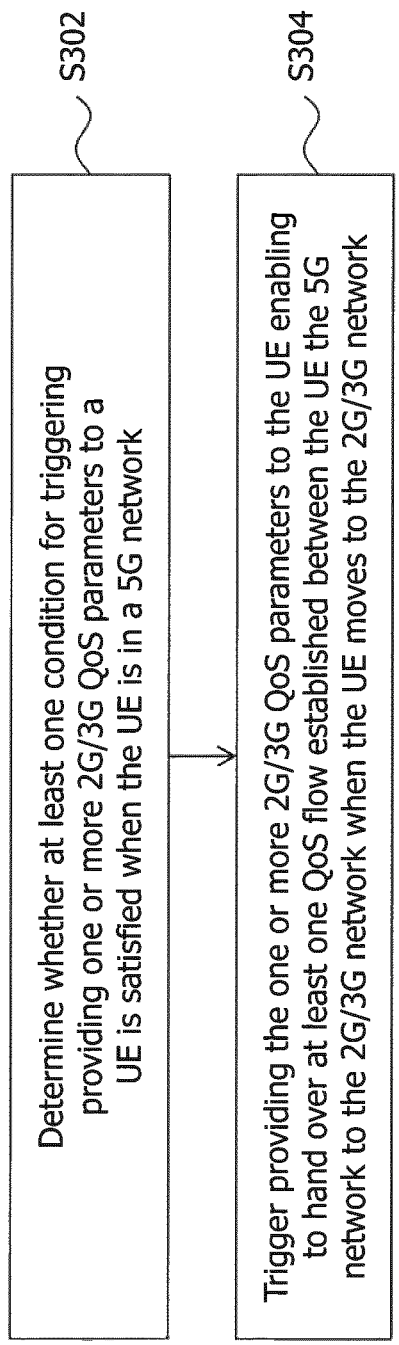

FIG. 3a schematically illustrates an exemplary modular composition of the network node 202 and FIG. 3b illustrates a corresponding method which may be performed by the network node 202. The basic operation of the network node 202 will be described in the following with reference to both FIGS. 3a and 3b.

In step S302, a determining module 302 of the network node 202 may determine whether at least one condition for triggering providing one or more 2G/3G QoS parameters to the UE 212 is satisfied when the UE 212 is in the 5G network. If it is determined that the at least one condition is satisfied, a triggering module 304 of the network node 202 may trigger, in step S304, providing the one or more 2G/3G QoS parameters to the UE 212, wherein providing the one or more 2G/3G QoS parameters to the UE 212 is required to hand over at least one QoS flow established between the UE 212 and the 5G network to the 2G/3G network when the UE 212 moves to the 2G/3G network.

The UE 212 may move directly from the 5G network to the 2G/3G network or the UE 212 may move to the 2G/3G network via the 4G network. When the UE 212 moves directly from the 5G network to the 2G/3G network, the at least one QoS flow may be handed over to at least one corresponding PDP context in the 2G/3G network (e.g., for each QoS flow, a corresponding PDP context may be established in the 2G/3G network) and, when the UE 212 moves from the 5G network to the 2G/3G network via the 4G network, the at least one QoS flow may first be handed over to at least one corresponding bearer in the 4G network (e.g., for each QoS flow, a corresponding bearer may be established in the 4G network) and the at least one corresponding bearer may then be handed over to at least one corresponding PDP context in the 2G/3G network when the UE 212 moves from the 4G network to the 2G/3G network (e.g., for each bearer, a corresponding PDP context may be established in the 2G/3G network). The at least one QoS flow may belong to a PDU session established between the UE 212 and the 5G network and the at least one bearer may belong to a corresponding PDN connection established between the UE 212 and the 4G network.

Since, when moving to the 2G/3G network, a PDP context may not be activated for the at least one QoS flow (or the at least one corresponding bearer, respectively), providing the one or more 2G/3G QoS parameters to the UE 212 prior to moving to the 2G/3G network may enable transferring the at least one QoS flow (or the at least one corresponding bearer, respectively) into a PDP context of the 2G/3G network, as described above. The one or more 2G/3G QoS parameters may in other words be required to establish at least one PDP context in the 2G/3G network which corresponds to the at least one QoS flow established between the UE 212 and the 5G network. Transferring (i.e., handing over or "moving") the respective QoS flow (or the at least one corresponding bearer, respectively) into a corresponding PDP context may involve mapping an IP address and an APN associated with the PDU session to which the at least one QoS flow belongs (or an IP address and an APN associated with the PDN connection to which the at least one corresponding bearer belongs, respectively) to a corresponding IP address and a corresponding APN associated with the newly established PDP context. IP address preservation may thus be enabled when moving between the 5G network and the 2G/3G network (optionally, via the 4G network).

The at least one QoS flow established between the UE 212 and the 5G network may be allocated on at least one common network entity that supports interworking between the 4G network and the 5G network, such as an SMF+PGW-C acting as common gateway for both the 4G and the 5G network, for example. The network node 202 may in fact be the SMF+PGW-C, but it will be understood that the technique presented herein may be performed by any other appropriate network node of the 5G network as well, such as an AMF, for example. The common network entity, particularly the SMF+PGW-C, may have an interface to at least one of an SGSN of the 2G/3G network (e.g., a Gn/Gp interface to the SGSN) and an SGW of the 2G/3G network. In case of the SGW, the common network entity may have an S5/S8 interface to the SGW which, in turn, may have an S4 interface to the SGSN, for example. It will be understood that, even if the SMF+PGW-C supports such interfaces to the 2G/3G network, the UE may only reuse QoS flows (or bearers) as PDP contexts when moving from the 5G (or 4G) network to the 2G/3G network when the relevant 2G/3G QoS parameters are available to the UE.

The network node 202 may be configured to keep track of the source access technology and the target access technology in the mobility scenario so that, depending on the particular source access technology and target access technology (e.g., respective RAT types), the network node 202 may decide on triggering providing the one or more 2G/3G QoS parameters to the UE 212, as described above. Mobility from the 5G network to the 4G network as well as from the 4G network to the 2G/3G network may involve an IRAT handover, for example, but it will be understood that the technique presented herein may be employed in all other cases of UE mobility between the 5G network, the 4G network and the 2G/3G network as well. In either case, mobility may take place in both idle mode and connected node. As an example, the technique may be applied to cases of idle mode mobility when the UE 212 reselects the RAT or to cases of redirects, e.g., when the RAN directs the UE 212 to a different RAN which employs a different RAT. An NG-RAN of a 5G network may direct the UE 212 to a GERAN of a 2G network, a UTRAN of a 3G network, or an E-UTRAN of a 4G network, for example.

The at least one condition for triggering providing the one or more 2G/3G QoS parameters to the UE 212 determined in step S302 may refer to at least one of the following. In one variant, triggering providing the one or more 2G/3G QoS parameters to the UE 212 may be conditionally performed when the UE 212 is determined to have 2G/3G capabilities (e.g., when the UE 212 is capable of attaching to a 2G/3G network). In other words, the presence of 2G/3G capabilities of the UE 212 may be used as a condition for triggering providing the one or more 2G/3G QoS parameters to the UE 212 so that triggering providing the one or more 2G/3G QoS parameters to the UE 212 may only be performed when the UE 212 is determined to have 2G/3G capabilities. An indication that the UE 212 has 2G/3G capabilities may be obtained from the UE 212. The network node 202 may obtain this indication directly from the UE 212 (e.g., in a signaling procedure involving both the UE 212 and the network node 202) or in an indirect manner (e.g., from another network node which obtained the indication from the UE 212 previously). For example, the indication that the UE 212 has 2G/3G capabilities may be obtained during an attach procedure performed by the UE 212 with the 5G network or during a PDU session configuration procedure performed by the UE 212 with the 5G network. The PDU session configuration procedure may correspond to a PDU session establishment procedure or a PDU session modification procedure, for example. The indication may be conveyed in the form of a network capability information element as part of the UE network capabilities provided from the UE 212 to the network, for example.

In another variant, the network node 202, especially when the network node 202 is an AMF, may or may not trigger providing the one or more 2G/3G QoS parameters to the UE 212 per area or per PLMN, depending on the operator deployment. Triggering providing the one or more 2G/3G QoS parameters to the UE 212 may thus be conditionally performed depending on at least one of an area in which the UE 212 is located and a PLMN with which the UE 212 is associated.

Alternatively, triggering providing the one or more 2G/3G QoS parameters to the UE 212 may be performed independently from whether the UE 212 has 2G/3G capabilities as well as independently from the area or the PLMN. In such a case, the network node may always provide the one or more 2G/3G QoS parameters to the UE 212 and, if the UE 212 is not 2G/3G capable (e.g., if the UE 212 does not support 2G/3G QoS parameters), the UE 212 may simply ignore the received 2G/3G QoS parameters. The UE 212 may in other words only use the received 2G/3G QoS parameters if the UE 212 understands them.

The one or more 2G/3G QoS parameters may correspond to one or more R99 QoS parameters, for example, and may include at least one of a traffic class, a delivery order, an indication of delivery of erroneous SDUs, a maximum SDU size, a maximum bit rate for uplink, a maximum bit rate for downlink, a residual BER, an SDU error ratio, a transfer delay, a traffic handling priority, an ARP, a guaranteed bit rate for uplink, and a guaranteed bit rate for downlink. The one or more 2G/3G QoS parameters may be mapped from one or more corresponding 5G QoS parameters, e.g., from one or more QoS parameters of the at least one QoS flow established between the UE 212 and the 5G network. More specifically, when the UE 212 moves directly from the 5G network to the 2G/3G network, each of the one or more 5G QoS parameters of the at least one QoS flow may be mapped to a corresponding 2G/3G QoS parameter among the one or more 2G/3G QoS parameters and, when the UE 212 moves from the 5G network to the 2G/3G network via the 4G network, each of the one or more 5G QoS parameters of the at least one QoS flow may first be mapped to a corresponding 4G QOS parameter, such as an EPS bearer QoS parameter, and each of the one or more 4G QoS parameters may then be mapped to a corresponding 2G/3G parameter among the one or more 2G/3G QoS parameters when the UE 212 moves from the 4G network to the 2G/3G network. In one variant, the one or more 2G/3G QoS parameters may be provided to the UE 212 in a single message together with the one or more 5G QoS parameters (or the 4G QoS parameters, respectively) and, in another variant, the one or more 2G/3G QoS parameters may be provided to the UE 212 in a separate message, i.e., separate from the 5G QoS parameters (or the 4G QoS parameters, respectively). The one or more 2G/3G parameters may be mapped during establishment of the at least one QoS flow in the 5G network, for example.

Figure 4B:
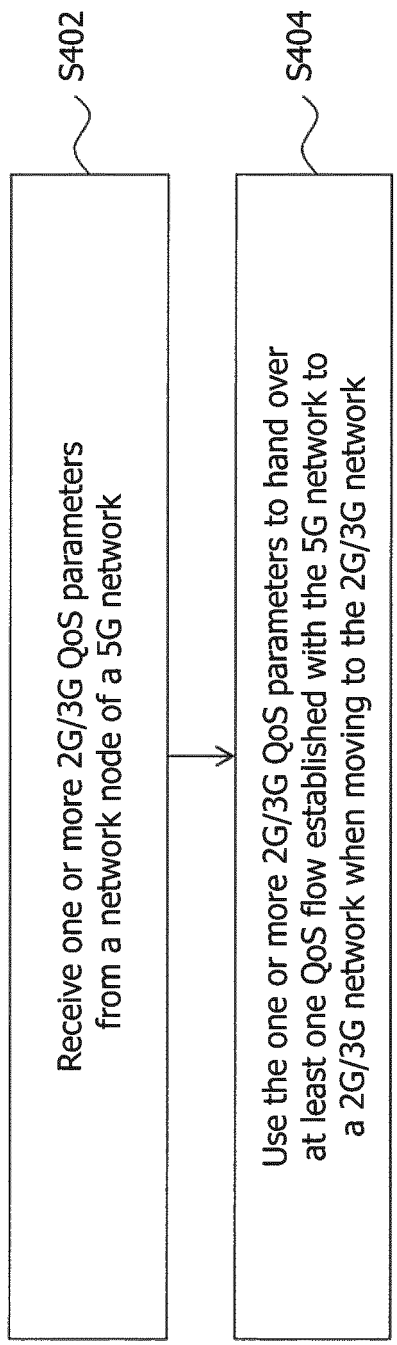

FIG. 4a schematically illustrates an exemplary modular composition of the UE 212 and FIG. 4b illustrates a corresponding method which may be performed by the UE 212. The basic operation of the UE 212 will be described in the following with reference to both FIGS. 4a and 4b. This operation may be complementary to the operation of the network node 202 described above in relation to FIGS. 3a and 3b and, as such, aspects described above with regard to the operation of the UE 212 may be applicable to the operation of the UE 212 described in the following as well. Unnecessary repetitions are thus omitted.

In step S402, a receiving module 402 of the UE 212 may receive one or more 2G/3G QoS parameters from a network node 202 of the 5G network. In step S404, a using module 404 of the UE 212 may use the one or more 2G/3G QoS parameters to hand over at least one QoS flow established between the UE 212 and the 5G network to the 2G/3G network when the UE 212 moves to the 2G/3G network.

As described above, the one or more 2G/3G QoS parameters may be required to establish at least one PDP context in the 2G/3G network which corresponds to the at least one QoS flow established between the UE 212 and the 5G network. An indication that the UE 212 has 2G/3G capabilities may be sent to the 5G network, wherein the indication that the UE 212 has 2G/3G capabilities may be sent during an attach procedure performed by the UE 212 with the 5G network or during a PDU session configuration procedure performed by the UE 212 with the 5G network. The one or more 2G/3G QoS parameters may be received from the network node 202 in a single message together with one or more 5G QoS parameters, for example.

Figure 5:
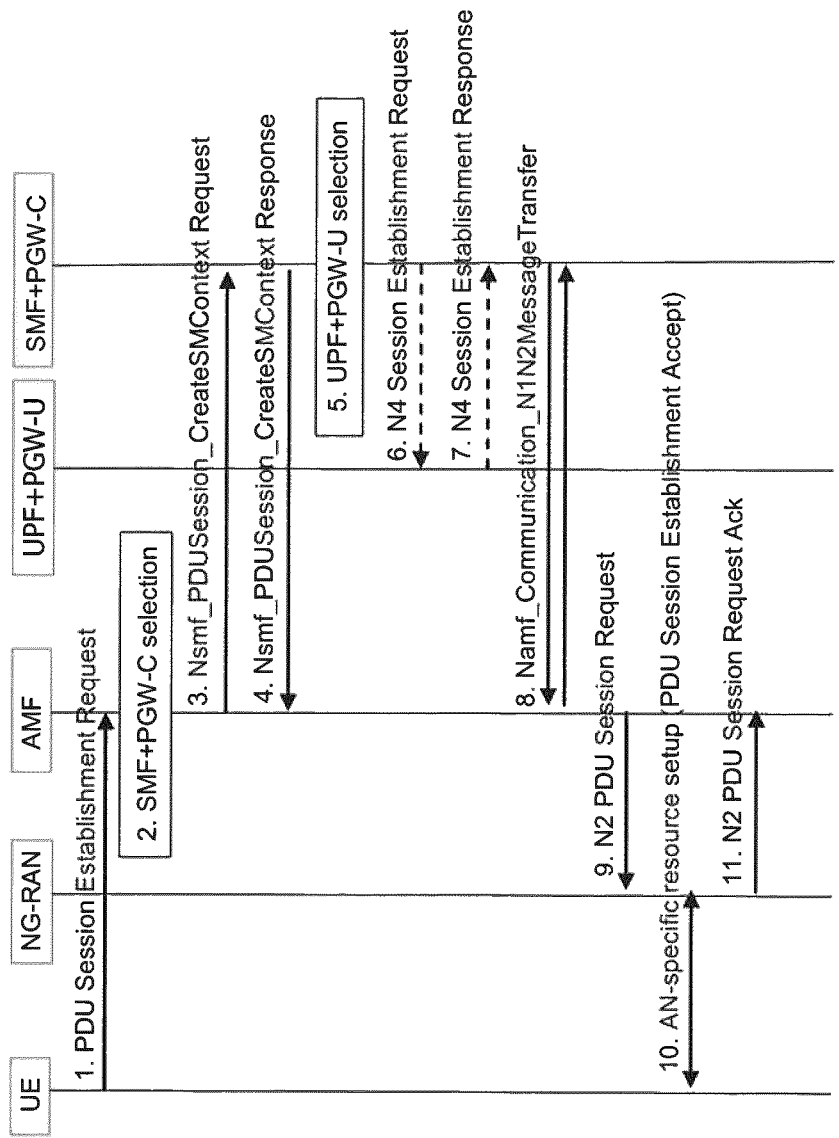
FIG. 5 illustrates a signaling diagram of an exemplary PDU session establishment procedure performed by a UE with a 5G network according to the present disclosure.

FIG. 5 illustrates a signaling diagram of an exemplary PDU session establishment procedure performed by a UE with a 5G network. It will be understood that this procedure is merely exemplary and that the technique presented herein may be employed with other procedures as well. It will further be understood that the procedure shown in FIG. 5 is simplified and mainly focuses on those aspects which are relevant for understanding the technique presented herein.

The procedure assumes that the UE has already registered on the AMF. In step 1, the UE initiates the PDU session establishment procedure by sending a PDU Session Establishment Request to the AMF. This request includes an indication that the UE has 2G/3G capabilities (e.g., that the UE supports R99 QoS parameters), e.g., in the form of a new network capability information element or as additional information in an existing network capability information element. The AMF then selects, in step 2, an SMF+PGW-C and invokes, in step 3, the Nsmf_PDUSession_CreateSM-Context Request operation, as part of which the SMF+PGW-C receives the indication of the UE 2G/3G capabilities. The SMF+PGW-C then responds by invoking the Nsmf_PDUSession_CreateSMContext Response operation in step 4. In step 5, the SMF+PGW-C selects a corresponding User Plane Function+Packet Data Network Gateway-User (UPF+PGW-U) entity and may perform, in steps 6 and 7, an N4 Session Establishment procedure with the selected UPF+PGW-U.

In step 8, the SMF+PGW-C invokes the Namf_Communication_N1N2MessageTransfer operation, as part of which not only regular 5G QoS parameters for the QoS flows associated with the PDU session being established are sent to the AMF, but also corresponding 2G/3G QoS parameters (e.g., R99 QoS parameters) which may be mapped from the 5G QoS parameters, as described above. In step 9, the AMF sends this information to the NG-RAN within the N2 PDU Session Request, from where this information is then forwarded to the UE by an Access Network specific signaling exchange including a PDU Session Establishment Accept in step 10. At this point, the UE receives the 2G/3G QoS parameters and stores the received parameters for later use when moving to the 2G/3G network, i.e., in order to be able to activate PDP contexts in the 2G/3G network that correspond to the QoS flows associated with the PDU session being established, as described above. In step 11, the NG-RAN sends an N2 PDU Session Request Acknowledgment to the AMF.

Figure 6:
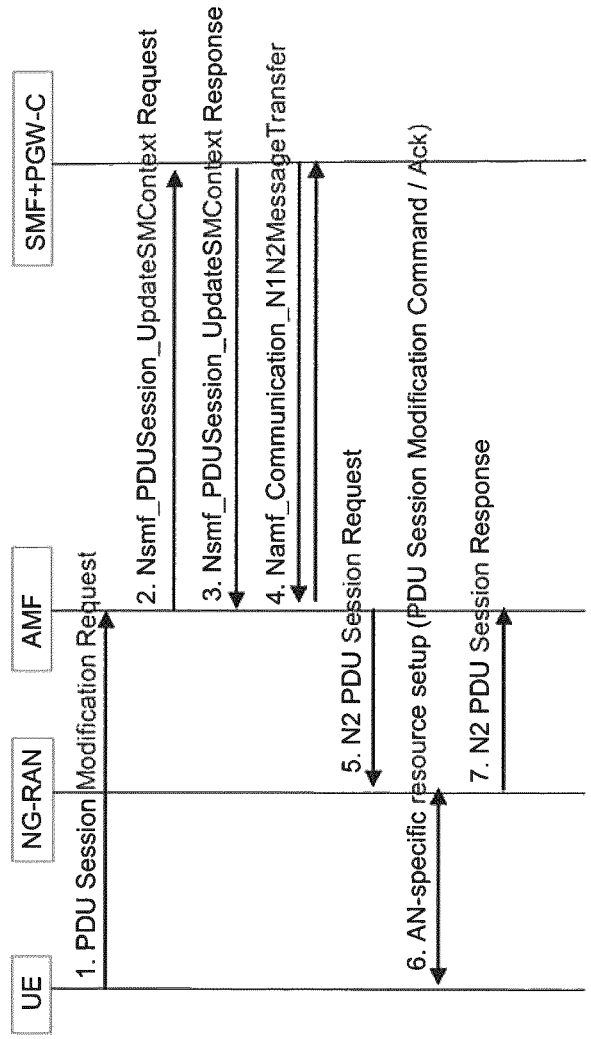
FIG. 6 illustrates a signaling diagram of an exemplary PDU session modification procedure performed by a UE with a 5G network according to the present disclosure.

FIG. 6 illustrates a signaling diagram of an exemplary PDU session modification procedure performed by a UE with a 5G network. Similar to FIG. 5, it will be understood that this procedure is merely exemplary and that the procedure is simplified and focuses on those aspects which are relevant for understanding the technique presented herein. The procedure may be performed when one or more regular 5G QoS parameters exchanged between the UE and the 5G network are modified.

In step 1, the UE initiates the PDU session modification procedure by sending a PDU Session Modification Request to the AMF. This request includes an indication that the UE has 2G/3G capabilities (e.g., that the supports R99 QoS parameters), e.g., in the form of a new network capability information element or as additional information in an existing network capability information element. The AMF then invokes, in step 2, the Nsmf_PDUSession_UpdateSM-Context operation, as part of which the SMF+PGW-C receives the indication of the UE 2G/3G capabilities. The SMF+PGW-C then responds by invoking the Nsmf_P-DUSession_UpdateSMContext Response operation in step 3. In step 4, the SMF+PGW-C invokes the Namf_Communication_N1-N2MessageTransfer operation, as part of which not only regularly updated 5G QoS parameters for the QoS flows associated with the PDU session are sent to the AMF, but also corresponding 2G/3G QoS parameters (e.g., R99 QoS parameters) which may be mapped from the updated 5G QoS parameters, as described above. In step 5, the AMF sends this information to the NG-RAN within the N2 PDU Session Request, from where this information is forwarded to the UE by an Access Network specific signaling exchange including a PDU Session Modification Command/Acknowledgment in step 6. At this point, the UE receives the 2G/3G QoS parameters and stores the received parameters for later use when moving to the 2G/3G network, i.e., in order to be able to activate PDP contexts in the 2G/3G network that correspond to the QoS flows associated with the PDU session being established, as described above. In step 7, the NG-RAN sends an N2 PDU Session Response to the AMF.

As an alternative, the SMF+PGW-C (or the AMF) could include the 2G/3G QoS parameters in a PDU session modification procedure even if the UE has not indicated that it has 2G/3G capabilities (in accordance with step 1 above). A UE not supporting 2G/3G QoS parameters may then simply ignore the received parameters.

As has become apparent from the above, the present disclosure provides a technique for preparing UE mobility to a 2G/3G network for a UE moving from a 5G network, optionally via a 4G network, to the 2G/3G network. According to the technique, one or more 2G/3G QoS parameters may be provided to the UE which are required to hand over at least one QoS flow established between the UE and the 5G network to the 2G/3G network when the UE moves to the 2G/3G network. Handing over a respective QoS flow to a corresponding PDP context may involve mapping an IP address and an APN associated with the PDU session to which the at least one QoS flow belongs to a corresponding IP address and a corresponding APN associated with the newly established PDP context, so that IP address preservation may be enabled between the 5G network and the 2G/3G network (optionally, via the 4G network). The UE may thus keep its IP address during mobility among the 5G, 4G and 2G/3G networks and the need to re-initiate respective sessions (e.g., PDN or PDU sessions) each time the UE moves from one network to another, possibly including performing initial IMS registrations including full authentication, may be avoided. Corresponding load in the networks as well as session breaks including drop of packet connectivity may thus be prevented.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for preparing User Equipment (UE) mobility to a 2G/3G network for a UE moving from a 5G network to the 2G/3G network, the method being performed by a network node of the 5G network and comprising:
   determining that the UE has 2G/3G capabilities when the UE is in the 5G network; and
   triggering providing one or more 2G/3G Quality of Service (QoS) parameters to the UE required to hand over at least one QoS flow established between the UE and the 5G network to the 2G/3G network when the UE moves to the 2G/3G network, wherein triggering providing the one or more 2G/3G QoS parameters to the UE is performed based on the determination that the UE has the 2G/3G capabilities.

2. The method of claim 1, wherein the one or more 2G/3G QoS parameters are required to establish at least one Packet Data Protocol (PDP) context in the 2G/3G network which corresponds to the at least one QoS flow established between the UE and the 5G network.

3. The method of claim 2, wherein the at least one QoS flow established between the UE and the 5G network is allocated on at least one common network entity that supports interworking between a 4G network and the 5G network.

4. The method of claim 3, wherein the common network entity has an interface to at least one of a Serving General Packet Radio Service (GPRS) Support Node (SGSN) of the 2G/3G network and a Serving Gateway (SGW) of the 2G/3G network.

5. The method of claim 1, wherein an indication that the UE has 2G/3G capabilities is obtained from the UE.

6. The method of claim 5, wherein the indication that the UE has 2G/3G capabilities is obtained during an attach procedure performed by the UE with the 5G network or during a Protocol Data Unit (PDU) session configuration procedure performed by the UE with the 5G network.

7. The method of claim 1, wherein triggering providing the one or more 2G/3G QoS parameters to the UE is performed independently from whether the UE has 2G/3G capabilities.

8. The method of claim 1, wherein triggering providing the one or more 2G/3G QoS parameters to the UE s conditionally performed depending on at least one of an area in which the UE is located and a Public Land Mobile Network (PLMN) with which the UE is associated.

9. The method of claim 1, wherein the one or more 2G/3G QoS parameters are mapped from one or more corresponding 5G QoS parameters.

10. The method of claim 9, wherein the one or more 2G/3G QoS parameters are provided to the UE in a single message together with the one or more 5G QoS parameters.

11. The method of claim 9, wherein the one or more 2G/3G QoS parameters are mapped during establishment of the at least one QoS flow in the 5G network.

12. A method for implementing User Equipment (UE) mobility to a 2G/3G network for a UE moving from a 5G network to the 2G/3G network, the method being performed by the UE and comprising:
    sending, to the network node of the 5G network, an indication that the UE has 2G/3G capabilities, and
    receiving one or more 2G/3G Quality of Service (QoS) parameters from a network node of the 5G network and using the one or more 2G/3G QoS parameters to hand over at least one QoS flow established between the UE and the 5G network to the 2G/3G network when the UE moves to the 2G/3G network.

13. The method of claim 12, wherein the one or more 2G/3G QoS parameters are required to establish at least one Packet Data Protocol (PDP) context in the 2G/3G network which corresponds to the at least one QoS flow established between the UE and the 5G network.

14. The method of claim 12, wherein the indication that the UE has 2G/3G capabilities is sent during an attach procedure performed by the UE with the 5G network or during a Protocol Data Unit (PDU) session configuration procedure performed by the UE with the 5G network.

15. The method of claim 12, wherein the one or more 2G/3G QoS parameters are received from the network node in a single message together with one or more 5G QoS parameters.

16. A network node of a 5G network for preparing User Equipment (UE) mobility to a 2G/3G network for a UE moving from a 5G network to the 2G/3G network, comprising:
    at least one processor; and
    at least one memory, the at least one memory containing instructions executable by the at least one processor, whereby the network node is operable to:
    determine that the UE has 2G/3G capabilities when the UE is in the 5G network; and
    trigger providing one or more 2G/3G Quality of Service (QoS) parameters to the UE required to hand over at least one QoS flow established between the UE and the 5G network to the 2G/3G network when the UE moves to the 2G/3G network, wherein triggering providing the one or more 2G/3G QoS parameters to the UE is performed based on the determination that the UE has the 2G/3G capabilities.

17. A User Equipment (UE) for implementing UE mobility to a 2G/3G network, the UE moving from a 5G network to the 2G/3G network, comprising:
    at least one processor; and
    at least one memory, the at least one memory containing instructions executable by the at least one processor, whereby the UE is operable to:
    send, to the network node of the 5G network, an indication that the UE has 2G/3G capabilities, and
    receive one or more 2G/3G Quality of Service (QoS) parameters from a network node of the 5G network and using the one or more 2G/3G QoS parameters to hand over at least one QoS flow established between the UE and the 5G network to the 2G/3G network when the UE moves to the 2G/3G network.

* * * * *